United States Patent [19]
Steeber et al.

[11] Patent Number: 5,628,393
[45] Date of Patent: May 13, 1997

[54] CONVEYOR APPARATUS HAVING A NODULAR CONVEYING SURFACE

[76] Inventors: Dorian F. Steeber, 14 Mountain Vista Rd., Taylors, S.C. 29687; Robert E. Reaser, 203 Sugar Creek La., Greer, S.C. 29650

[21] Appl. No.: 488,645

[22] Filed: Jun. 8, 1995

[51] Int. Cl.⁶ .................................................. B65G 15/42
[52] U.S. Cl. ........................................ 198/699.1; 198/853
[58] Field of Search ............................ 198/502.1, 688.1, 198/699.1, 690.2, 853

[56] References Cited

U.S. PATENT DOCUMENTS

| | | | |
|---|---|---|---|
| 415,434 | 11/1889 | Baker | 198/699.1 |
| 2,732,867 | 1/1956 | May et al. | 198/699.1 X |
| 4,569,434 | 2/1986 | Horii et al. | 198/699.1 X |
| 4,840,265 | 6/1989 | Sato et al. | 198/699.1 X |
| 4,880,107 | 11/1989 | Deal | 198/853 X |
| 4,925,013 | 5/1990 | Lapyere | 198/699.1 X |
| 5,323,893 | 6/1994 | Garbagnati | 198/699.1 X |
| 5,439,097 | 8/1995 | Takahashi et al. | 198/699.1 X |
| 5,507,383 | 4/1996 | Lapyere et al. | 198/853 |

FOREIGN PATENT DOCUMENTS 1334887  7/1963  France ................... 198/853

OTHER PUBLICATIONS

Brochure entitled Chains and Belts Product Selection Guide, Rainbow/Uni Industrial Products Corporation, Reading, PA 19605, undated.

Primary Examiner—D. Glenn Dayoan
Attorney, Agent, or Firm—Dunlap & Codding, P.C.

[57] ABSTRACT

A conveyor apparatus having a plurality of link members pivotally connected. Each link member having a forward end, a rearward end, a lower side, and an upper side. The upper side having a plurality of spaced apart nodules extending upwardly therefrom which function to effectively decrease the friction between an object disposed on the conveyor apparatus and the conveying surface of the conveyor apparatus.

12 Claims, 5 Drawing Sheets

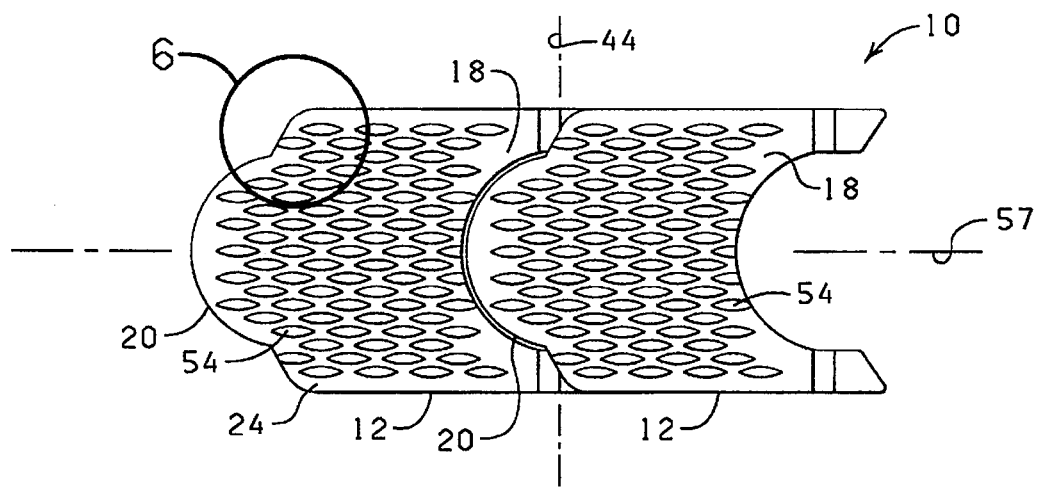
FIG. 1
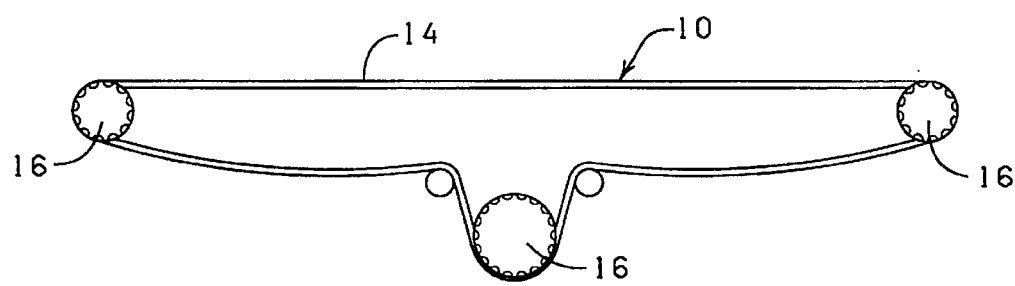
FIG. 2
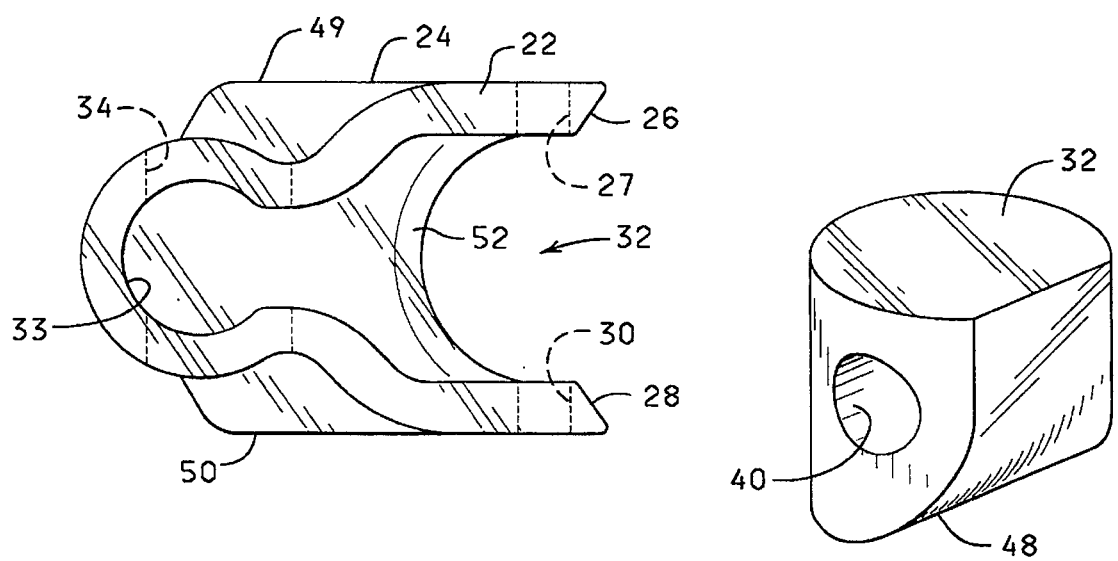
FIG. 3
FIG. 4

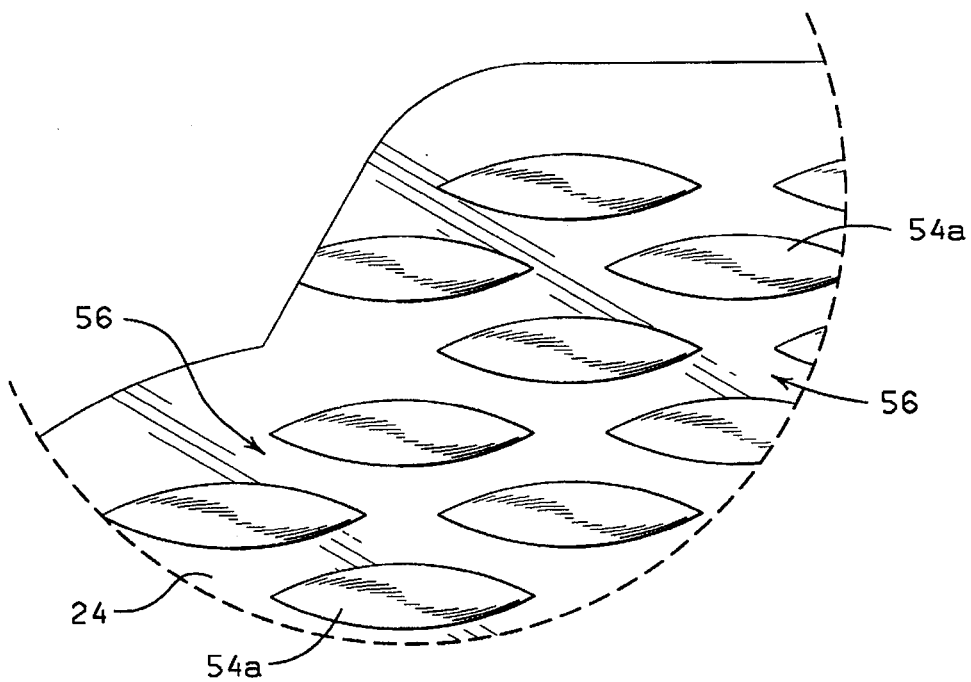
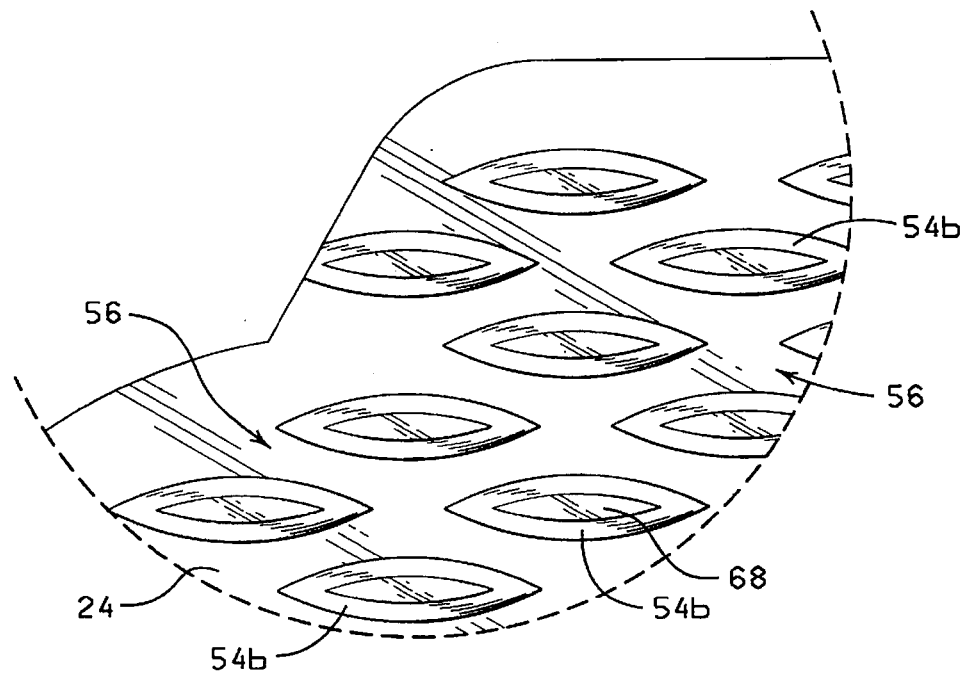

CONVEYOR APPARATUS HAVING A NODULAR CONVEYING SURFACE

BACKGROUND OF THE INVENTION

1. Field of the Invention

The present invention relates generally to conveyor belts and conveyor chains, and more particularly, but not by way of limitation, to a conveyor belt or conveyor chain having a plurality of nodules formed on an upper side thereof to provide a low friction conveying surface that remains substantially free of debris.

2. Description of Related Art

Many types of products are transported through a plant on a conveyor belt or a conveyor chain during the processing and packaging of the products. To this end, numerous types of conveyor belts and conveyor chains exist for transporting different products and accommodating the specific processing requirements of certain products. For example, flat wire belts are useful for transporting products that must be washed or dried in that water and air are able to pass freely through the wire belt. On the other hand, belts and chains with a continuous conveying surface are often used to transport meat, poultry, and beverage containers.

Particularly, when processing beverages, it is often required that the containers be backed up at certain points along the line. In these instances, the conveyor belt or chain continues to slide under the slower moving or stationary containers. A problem often encountered, however, is that the friction between the bottom of the containers and the conveying surface increases due to an increase in pressure caused by the accumulation of the containers or the gathering of debris on the conveying surface. The increased friction can result in product damage from wear on the product contact surface, deformation of flexible containers, and breakage of rigid containers due to excessive line pressure. In addition, the phenomena of "bridging" or "shingling" on containers is greatly increased with increased line pressure (friction) causing containers to lock together on the line, stopping production until a manual or mechanical unlocking occurs, and sometimes requiring the conveyor to be shut off to prevent damage to the containers.

To decrease the friction between the bottom of the containers and the conveying surface, the use of water, soap, various lubricants, or specially compounded surfactants is common on current designs of conveyor surfaces. These methods are undesirable because of the added cost to the operation and the complication of the proper disposal of the waste liquids. In addition, some container materials such as paper based laminates, and container decorations, such as labels, marking inks, and container attachments, such as instructions booklets, straws, and promotional coupons are damaged by the presence of these substances on the line. As such, most industries prefer that their conveyor systems be operated without lubricants and even without water, in other words "run dry".

To this end, a need has long existed for an improved conveyor apparatus that has a low friction conveying surface which reduces or eliminates the need for the use of soap and water and which provides a stable surface substantially free of debris, while remaining inexpensive to manufacture and operate. It is to such an improved conveyor apparatus that the present invention is directed.

BRIEF DESCRIPTION OF THE DRAWINGS

FIG. 1 is a top plan view of a portion of a conveyor chain constructed in accordance with the present invention.

FIG. 2 is a diagrammatic view of the conveyor chain of the present invention shown disposed about a pair of sprockets.

FIG. 3 is a bottom view of a link member constructed in accordance with the present invention.

FIG. 4 is a perspective view of a spacer used in the connection of one link member to another link member.

FIG. 7 is an enlarged top view illustrating a nodule having a rounded surface.

FIG. 8 is an enlarged top view illustrating a nodule having a flat surface.

DETAILED DESCRIPTION

Figure 5:
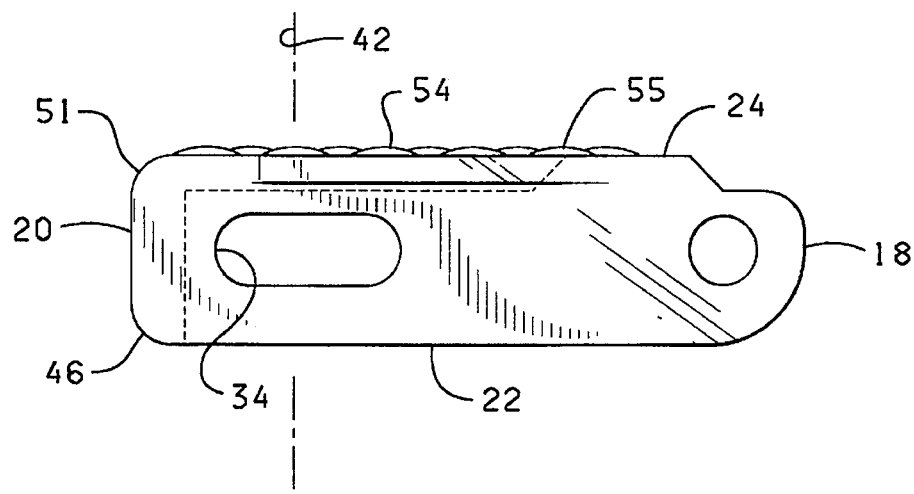
FIG. 5 is a side view of the link member of FIG. 3.

Referring now to the drawings, and more particularly to FIGS. 1 and 2, shown is a conveyor chain 10 constructed in accordance with the present invention. The conveyor chain 10 includes a plurality of link members 12. Only two link members 12 of the conveyor chain 10 are shown in FIG. 1. FIG. 2 is a diagrammatic view illustrating the conveyor chain 10 having been formed into a closed loop 14 which is generally extended about a plurality of sprockets 16 and used for transporting objects from one place to another in a manner well known in the art.

The link members 12 illustrated in FIGS. 1–6 form a conveyor chain commonly known as a "knuckle" chain. It will be understood by those of ordinary skill in the art that the description of the knuckle chain set forth herein is for the purpose of this description only in that a knuckle chain is an example of only one type of conveyor chain that the inventive concept of the present invention can be incorporated.

The link members 12 of the conveyor chain 10 preferably are integrally formed of a plastic or ceramic material, although the link members 12 could be constructed of a metal. Each link member 12 has a forward end 18, a rearward end 20, a lower side 22, and an upper side 24 (FIG. 5). The forward end 18 includes a first link portion 26 having a shaft opening 27 disposed therethrough and a second link portion 28 spaced apart from the first link portion 26 and having a shaft opening 30 which is in alignment with the shaft opening 27 of the first link portion 26. The first and second link portions 26 and 28 define a recess or socket 32 shaped to pivotally receive the rearward end 20 of an adjacent link member 12, as shown in FIG. 1.

The rearward end 20 has a substantially circular exterior configuration and is provided with a circular recess 33 open on the lower side 22 of the link member 12 (FIG. 3). An elongated shaft opening 34 is disposed through the rearward end 20 so as to intersect the recess 33.

In an assembled position, as shown in FIG. 1, the shaft opening 34 of the rearward end 20 is aligned with the shaft openings 27 and 30 of the forward end 18 of the adjacent link member 12 such that the link members 12 are positioned in an end-to-end relationship. Adjacent link members 12 are in turn pivotally interconnected with a link shaft or pin (not shown) disposed through the aligned shaft openings 27, 30 and 34 and secured therein in a conventional manner.

A spacer 38 with a shaft opening 40 as shown in FIG. 4, is disposed in the recess 33 of the rearward end 20 to prevent to-and-fro movement of one link member 12 relative to the adjacent link member 12, while permitting the link members 12 to rotate about an axis 42 (FIG. 5) due to the configuration of elongated shaft opening 34 in the rearward end 20. The link members 12 are also able to pivot about an axis 44 (FIG. 1) defined by the link shaft 36. The spacer 38 is rotatably disposed in the recess 33 of the rearward end 20 with the shaft opening 40 generally aligned with the shaft opening 33 disposed through the rearward end 20 of the link member 12.

The rearward end 20 and the spacer 38 are each provided with a curved surface 46 and 48, respectively, which are matingly engagable with the sprockets 16 (FIG. 1) to drive the conveyor chain 10 along a chain track (not shown) in a manner that is well known in the art.

The upper side 24 of each of the link members 12 is shown to be a substantially solid surface extending from the rearward end 20 to the forward end 18 with a portion of the upper side 24 extending laterally from each side or the link member 12 as shown in FIG. 3 to form a pair of wing portions 49 and 50. It will be appreciated, however, that the upper side 24 can be solid, as well as perforated, thereby providing an avenue for debris and liquids to drain from the upper side and reduce the amount of material required to construct the link member. The upper side 24 is arcuately shaped at the forward end 18 to matingly abut the rearward end 20 of the adjacent link member 12. To facilitate pivotation between adjacent link members 12 where the rearward end 20 of one link member 12 is matingly disposed in the recess 32 of the forward end 18 as illustrated in FIG. 1, the upper side 24 is provided with a radial edge 51 (FIG. 5) at the rearward end 20, and the upper side 24 is provided with a corresponding radial edge 52 (FIG. 3) at the forward end 20 shaped to substantially conform with the radial edge 51 of the rearward end 20.

As mentioned above, during some processes it is desirable that the objects carried on the conveyor chain 10 move at a slower speed than the conveyor chain or remain stationary while the conveyor chain 10 continues to move beneath the objects. To effectively reduce the friction between the conveyor chain 10 and an object disposed thereon, without the employment of water and soap, or other lubricant, a plurality of nodules 54 are formed on the upper side 24 of each link member 12. Each nodule 54 extends upwardly from the upper side 24 of the link member 12 an equidistance such that the nodules 54 define a planar conveying surface 55 (FIG. 5). The conveying surface 55 frictionally engages an object disposed on the conveying surface 55 when the object is being transported by the conveyor chain 10. In addition, the nodules 54 permit the conveying surface 55 to freely slide relative to the object when the object is disposed on the conveying surface 55 and the object is in a stationary state or moving at a slower speed than the conveyor chain 10.

The nodules 54 are spaced apart to form a plurality of channels 56. The nodules 54 are preferably elongated and oriented in a parallel relationship with respect to a longitudinal axis 57 (FIG. 1) extending from the forward end 18 to the rearward end 20 of the link members 12.

Figure 6:
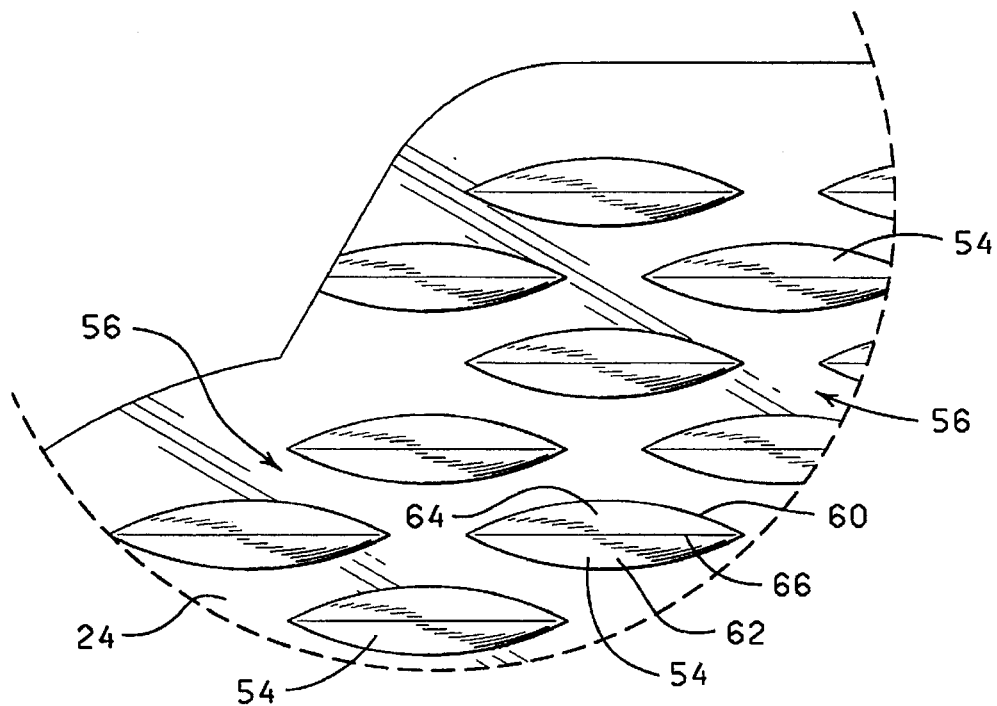
FIG. 6 is an enlarged view of the encircled area of FIG. 1 illustrating the nodules on the upper side of the link member.

As best illustrated in FIG. 6, each nodule 54 has a base portion 58 integrally connected to the upper side 24 of the link member 12 and an arcuate tapered portion 60. The tapered portion 60 is further defined to have a first arcuate surface 62 and a second arcuate surface 64. The first arcuate surface 62 and the second arcuate surface 64 are angled toward one another such that the intersection of the first arcuate surface 62 and the second arcuate surface 64 defines a thin longitudinally extending edge 66.

The friction between a slower moving or stationary object and the link members 12 is substantially reduced due to the reduced surface area provided by the longitudinally extending edge 66 of the nodules 54, thereby permitting the conveyor chain 10 to slide easily beneath an object when required. The reduction in friction is further facilitated by the formation of the channels 56 between the nodules 54 because debris, including dust, dirt and other contaminants which normally collect directly on the conveying surface and increases friction, collects in the channels 56 and thus does not affect the friction between the conveyor chain 10 and an object disposed thereon. The channels 56 further provide a flow path from the conveying surface 55 for water from production processes, lubricants and other materials that could damage or flaw the labeling or packaging of a product.

FIGS. 7 and 8 show alternative configurations of the nodules 54. More specifically, FIG. 7 shows a plurality of nodules 54a having a configuration similar to the nodules 54, except the nodules 54a have a rounded upper surface 67. FIG. 8 shows a plurality of nodules 54b also having a configuration similar to the nodules 54, except the nodules 54b have a flat upper surface 68 rather than a thin edge. It will further be realized that the nodules could be formed in a variety of other geometric configurations including, for example, square, rectangular, elliptical, triangular and star shaped.

Figure 9:
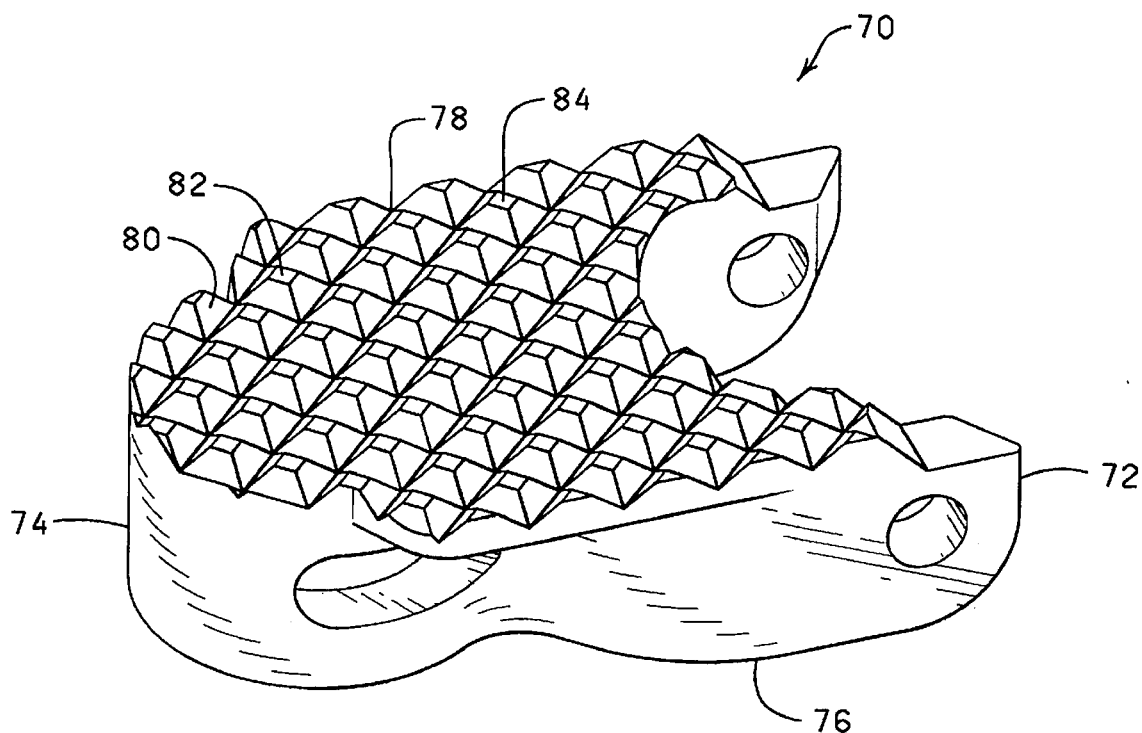
FIG. 9 is a perspective view of another link member constructed in accordance with the present invention.

FIG. 9 illustrates another embodiment of a link member 70 having a forward side 72, a rearward side 74, a lower side 76, and an upper side 78. The upper side 78 has a plurality of grooves 80 which in turn define a plurality of nodules 82 extending from the upper side 78 of the link member 70 and defining a planar conveying surface 84. The grooves 80 can be formed in a criss-cross pattern, as shown, such that the nodules 82 are spaced apart. Alternatively, a lateral or longitudinal oriented pattern can be formed thereby resulting in elongated nodules.

It will be appreciated that the grooves 80 can be formed during the molding process or machined into the link member 70, and the grooves 80 can be configured so as to provide a variety of shapes of nodules including round, oval, square, rectangular or triangular and with a flat surface, rounded surface, or edged surface.

Because of the sliding engagement experienced between the conveying surface and a slower moving or stationary object disposed on the conveyor chain 10, the conveying surface wears over a period of time. To provide an indicator of when replacement of the link members 12 is needed, the link members 12 can be formed in such a manner that the nodules 54, 54a and 54b are formed of a material dyed a color that is in contrast to the color of the upper side 24 of the link member 12. In practice, an operator will know the link members 12 are in need of replacement upon visual inspection when the color forming the nodules 54 is substantially worn away.

Figure 10:
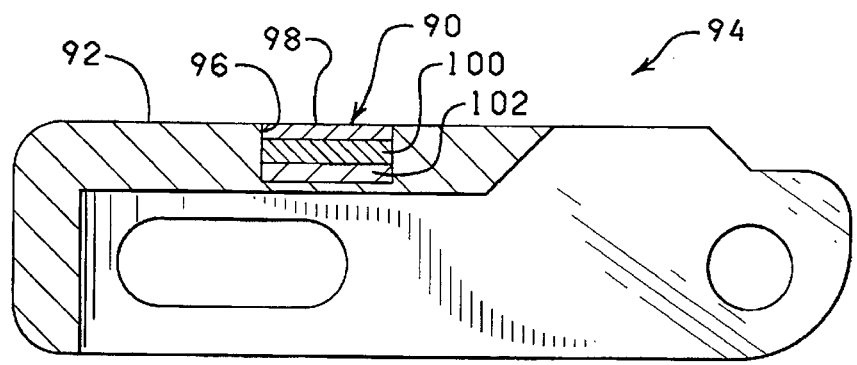
FIG. 10 is a cross section of a link member showing a wear indicator plug inserted therein.

FIG. 10 illustrates a wear indicator plug 90 disposed in an upper side 92 of a link member 94. The upper side 92 of the link member 94 is provided with a plug receiving recess 96. The wear indicator plug 90 is formed of a material having wear characteristics similar to the material used to construct the link member 94. The indicator plug 90 is constructed so as to have two or more colored layers, such as a first colored layer 98, a second colored layer 100, and a third colored layer 102. Each colored layer 98, 100, and 102 has a predetermined thickness and color variation to indicate the degree to which the conveying surface is worn and thus provide an indication of the need to replace either a single link member or a series of link members 94. For example, a first degree of wear will be indicated when the first colored layer 98 is visible, a second degree of wear when the second colored layer 100 is visible, and a third degree of wear when the third colored layer 102 is visible. The indicator plug 90 is secured in the plug receiving recess 96 with an adhesive or by fusing the wear indicator plug 90 to the link member 94 in a conventional manner.

Figure 11:
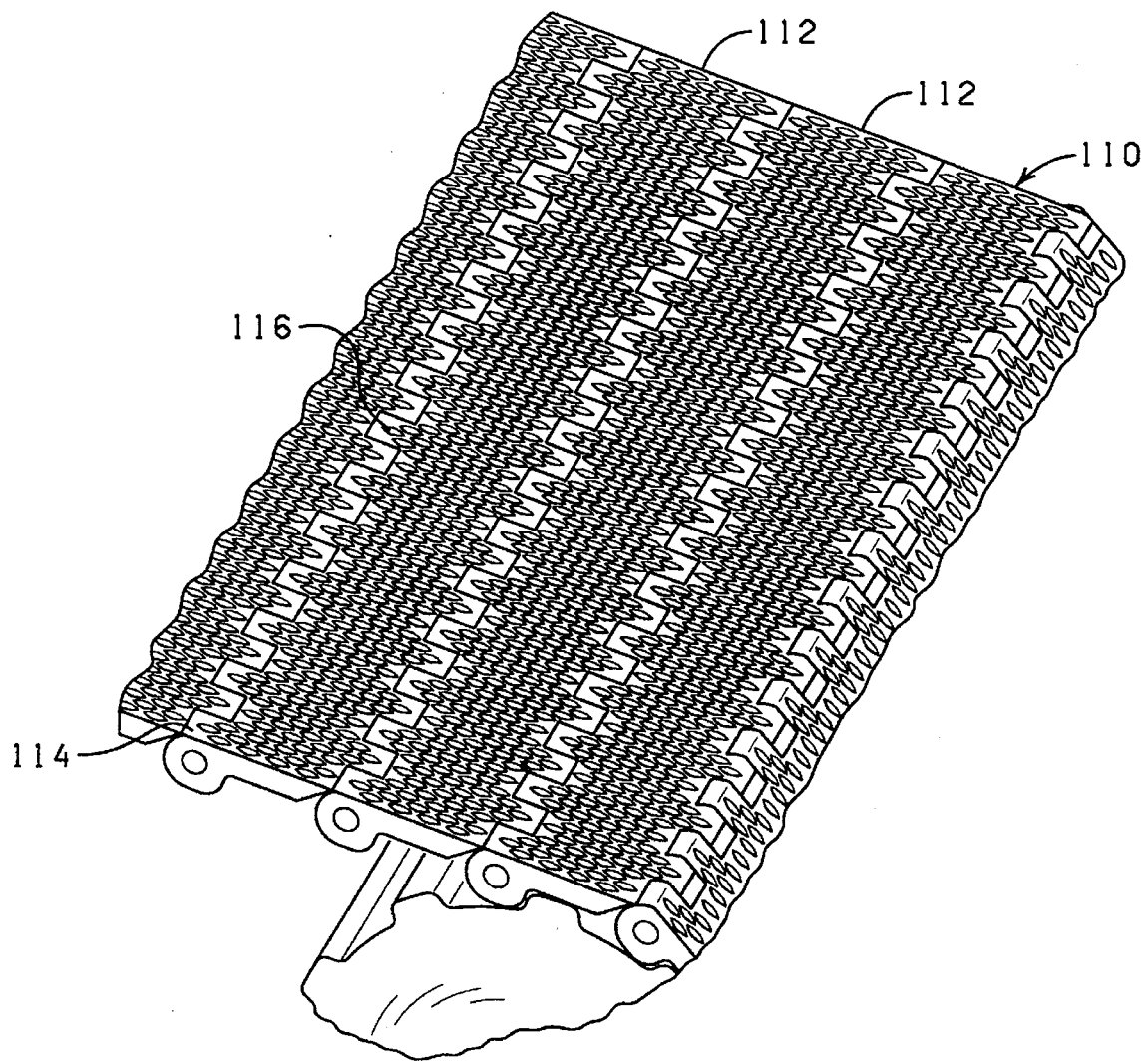
FIG. 11 is a perspective view of a portion of a conveyor belt constructed in accordance with the present invention.

As previously stated, the inventive concept of providing nodules on the upper side of a conveyor apparatus to reduce friction can be employed with other types of conveyor apparatuses. For example, FIG. 11 illustrates a conveyor belt 110, similar to that in U.S. Pat. No. 5,413,211, issued to William G. Faulkner on May 9, 1995, which is specifically incorporated herein by reference. The conveyor belt 110 comprises a plurality of link members 112 pivotally interconnected in an end-to-end relationship. Each link member 112 has an upper side 114 with a plurality of nodules 116 formed thereon and extending upwardly therefrom an equidistance from the upper side 114 of the link member 112 so as to define a planar conveying surface adapted to support an object disposed thereon.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed:

1. A conveyor apparatus, comprising:
    a plurality of link members interconnected in an end-to-end relationship to form a closed loop, each link member having a forward end, a rearward end, a lower side, and an upper side, each of the link members having a plurality of nodules extending from the upper side thereof so as to define a low friction conveying surface whereby the link member freely slides relative to an object disposed on the low friction conveying surface when the link member is caused to move relative to the object.

2. The apparatus of claim 1 wherein each link member is characterized as having a longitudinal axis extending from the first end to the second end thereof, and wherein each of the nodules has an elongated configuration and is oriented in a parallel relationship with respect the longitudinal axis of the link member.

3. The apparatus of claim 2 wherein the nodules have a base portion connected to the upper side of the link member and a tapered portion having a first surface and a second surface, the first surface and the second surface being angled toward one another such that the intersection of the first surface and the second surface defines a thin longitudinally extending edge.

4. The apparatus of claim 2 wherein each of the nodules is spaced apart from an adjacent nodule so as to form a plurality of channels for collecting debris therein and provide a fluid flow path across the upper side of the link member.

5. The conveying apparatus of claim 2 wherein the nodules have a base portion connected to the upper side of the link member, a tapered portion, and a flat upper surface.

6. The conveying apparatus of claim 2 wherein the nodules have a base portion connected to the upper side of the link member, a tapered portion, and a rounded upper surface.

7. An apparatus for transporting an object from one place to another, comprising:
    a plurality of link members interconnected in an end-to-end relationship to form a closed loop, each link member having a forward end, a rearward end, and an upper side, the upper side having a plurality of nodules extending upwardly therefrom so as to define a conveying surface adapted to frictionally engage the object when the object is disposed on the conveying surface of the link member and the object is being transported by the link member and to reduce frictional engagement between the object and the link member when the link member moves relative to the object with the object disposed on the conveying surface, each link member having a longitudinal axis extending from the first end to the second end thereof and each of the nodules having an elongated configuration oriented in a parallel relationship with respect to the longitudinal axis of the link member, each of the nodules having a base portion connected to the upper side of the link member and a tapered portion having a first surface and a second surface, the first surface and the second surface being angled toward one another such that the intersection of the first surface and the second surface defines a thin longitudinally extending edge.

8. An apparatus for transporting an object from one place to another, comprising:
    a plurality of link members interconnected in an end-to-end relationship to form a closed loop, each link member having a forward end, a rearward end, and an upper side, the upper side having a plurality of nodules extending upwardly therefrom so as to define a conveying surface adapted to frictionally engage the object when the object is disposed on the conveying surface of the link member and the object is being transported by the link member and to reduce frictional engagement between the object and the link member when the link member moves relative to the object with the object disposed on the conveying surface, the nodules dyed a color in contrast to the color of the upper side of the link member so as to provide a visual indication of when the nodules are worn.

9. An apparatus for transporting an object from one place to another, comprising:
    a plurality of link members interconnected in an end-to-end relationship to form a closed loop, each link member having a forward end, a rearward end, and an upper side, the upper side having a plurality of nodules extending upwardly therefrom so as to define a conveying surface adapted to frictionally engage the object when the object is disposed on the conveying surface of the link member and the object is being transported by the link member and to reduce frictional engagement between the object and the link member when the link member moves relative to the object with the object disposed on the conveying surface, at least one of the link members having a plug receiving recess disposed in the upper side thereof; and
    a wear indicator plug disposed in the plug receiving recess, the wear indicator plug constructed of at least two colored layers with each layer having a predetermined thickness and color to indicate the degree to which the conveying surface is worn.

10. A conveyor apparatus, comprising:

a plurality of interconnected link members, each of the link members being of unitary construction and having a forward end, a rearward end, a lower side, an upper side, and a plurality of nodules extending from the upper side thereof defining a low friction conveying surface whereby the link member freely slides relative to an object disposed on the low friction conveying surface when the link member is caused to move relative to the object.

11. A conveyor apparatus, comprising:

a plurality of interconnected link members, each of the link members having a forward end, a rearward end, a lower side, an upper side, and a plurality of nodules extending from the upper side thereof, the nodules dyed a color in contrast to the color of the upper side of the link member so as to provide a visual indication of when the nodules are worn, the nodules of each of the link members defining a low friction conveying surface whereby the link member freely slides relative to an object disposed on the low friction conveying surface when the link member is caused to move relative to the object.

12. A conveyor apparatus, comprising:

a plurality of interconnected link members, each link member having a forward end, a rearward end, a lower side, and an upper side, the upper side defining a conveying surface, at least one of the link members having a plug receiving recess disposed in the upper side thereof; and a wear indicator plug disposed in the plug receiving recess, the wear indicator plug constructed of at least two colored layers with each layer having a predetermined thickness and color to indicate the degree to which the conveying surface is worn.

* * * * *

UNITED STATES PATENT AND TRADEMARK OFFICE
CERTIFICATE OF CORRECTION

PATENT NO. : 5,628,393
DATED : May 13, 1997
INVENTOR(S) : Steeber et al.

Page 1 of 4

It is certified that error appears in the above-identified patent and that said Letters Patent is hereby corrected as shown below:

Cover page, References Cited, OTHER PUBLICATIONS, insert --Aikens et al., Wear-Indicating Pressure Belt, IBM Tech., Disclosure Bulletin, Vol. 23, No. 2--.

In the drawings, Figure 4, please delete drawing element numeral "32" and insert --38-- as indicated below.

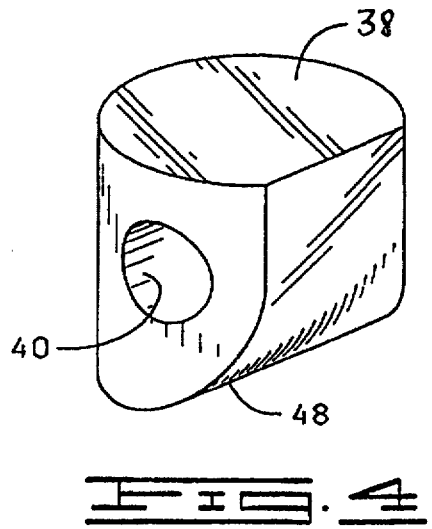

FIG. 4

UNITED STATES PATENT AND TRADEMARK OFFICE
CERTIFICATE OF CORRECTION

PATENT NO. : 5,628,393
DATED : May 13, 1997
INVENTOR(S) : Steeber et al.

It is certified that error appears in the above-identified patent and that said Letters Patent is hereby corrected as shown below:

In the drawings, Figure 6, please add drawing element numeral --58-- as indicated below.

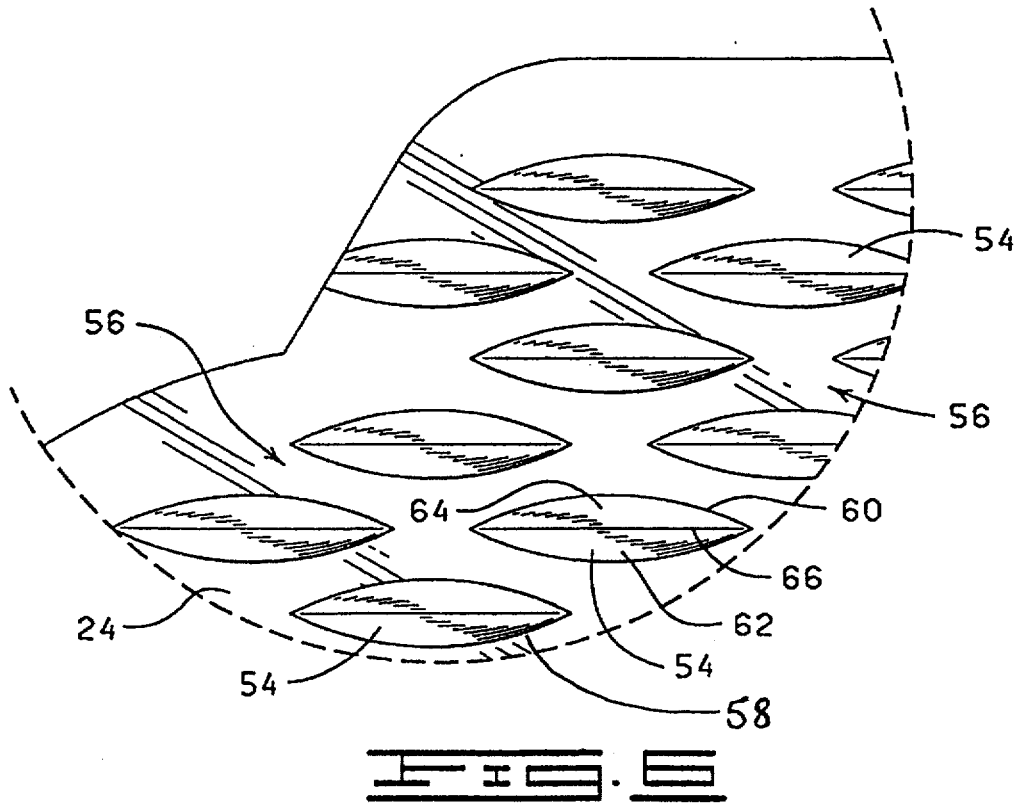

Fig. 6

UNITED STATES PATENT AND TRADEMARK OFFICE
CERTIFICATE OF CORRECTION

PATENT NO. : 5,628,393
DATED : May 13, 1997
INVENTOR(S) : Steeber et al.

It is certified that error appears in the above-identified patent and that said Letters Patent is hereby corrected as shown below:

In the drawings, Figure 7, please add drawing element numeral --67-- as indicated below.

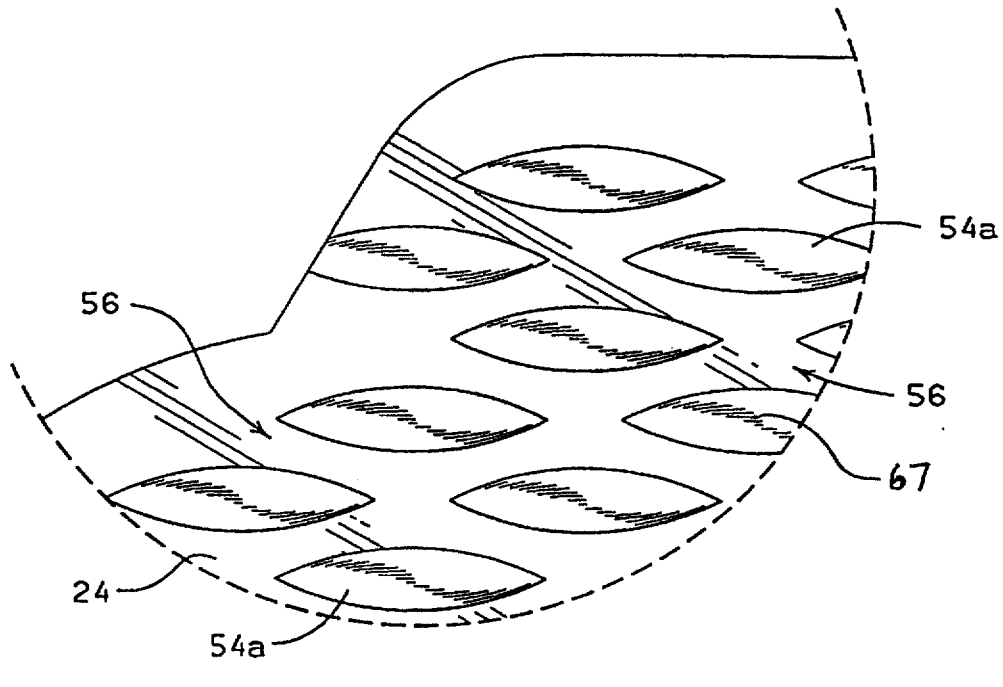

Fig. 7

UNITED STATES PATENT AND TRADEMARK OFFICE
CERTIFICATE OF CORRECTION

PATENT NO. : 5,628,393
DATED : May 13, 1997
INVENTOR(S) : Steeber et al.

It is certified that error appears in the above-identified patent and that said Letters Patent is hereby corrected as shown below:

Column 3, line 10, please delete "link shaft 36" and substitute therefor --link shaft (not shown)--.

Column 3, line 23, please delete "or" and substitute therefor --of--.

Column 3, lines 37-38, please delete "forward end 20" and substitute therefor --forward end 18--.

Column 5, line 54, after "respect" please insert --to--.

Signed and Sealed this

Twenty-seventh Day of January, 1998

Attest:

BRUCE LEHMAN

Attesting Officer     Commissioner of Patents and Trademarks